United States Patent
Liu et al.

(10) Patent No.: US 11,214,148 B2
(45) Date of Patent: Jan. 4, 2022

(54) DISTRIBUTED HIGH-FREQUENCY AC ELECTRICAL SYSTEM FOR THE ELECTRIC VEHICLE

(71) Applicant: South China University of Technology, Guangzhou (CN)

(72) Inventors: Junfeng Liu, Guangzhou (CN); Jialei Wu, Guangzhou (CN); Jun Zeng, Guangzhou (CN); Fei Luo, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 292 days.

(21) Appl. No.: 15/779,127

(22) PCT Filed: Nov. 25, 2016

(86) PCT No.: PCT/CN2016/107170
§ 371 (c)(1),
(2) Date: May 25, 2018

(87) PCT Pub. No.: WO2017/088803
PCT Pub. Date: Jun. 1, 2017

(65) Prior Publication Data
US 2018/0345792 A1 Dec. 6, 2018

(30) Foreign Application Priority Data
Nov. 27, 2015 (CN) .......................... 201510843489.3

(51) Int. Cl.
*B60L 1/14* (2006.01)
*B60L 1/00* (2006.01)
(Continued)

(52) U.S. Cl.
CPC .................................... *B60L 1/14* (2013.01);
*B60L 1/00* (2013.01); *B60L 50/51* (2019.02);
*B60R 16/03* (2013.01);
(Continued)

(58) Field of Classification Search
CPC combination set(s) only.
See application file for complete search history.

(56) References Cited

U.S. PATENT DOCUMENTS

| 5,465,010 A | 11/1995 | Rimmer |
| 2006/0091730 A1* | 5/2006 | Chiao ..................... B60L 50/16 307/10.1 |

(Continued)

FOREIGN PATENT DOCUMENTS

| CN | 1360687 A | 7/2002 |
| CN | 104682580 A | 6/2015 |

(Continued)

OTHER PUBLICATIONS

International Search Report dated Mar. 1, 2017, Application No. PCT/CN2016/107170.

*Primary Examiner* — Daniel Kessie
(74) *Attorney, Agent, or Firm* — The Dobrusin Law Firm, P.C.

(57) ABSTRACT

The present invention discloses a distributed high-frequency AC electrical system for the electric vehicle. The system divides all loads of the electric vehicle into four load areas according to their spatial positions. Four high-frequency inverters and four DC input interfaces are contained in the system, with each of the four load areas being configured with one of the four high-frequency inverters, and each of the four high-frequency inverters being configured with one of the four DC input interfaces. One end of each DC input interface is connected to the DC side of the corresponding high-frequency inverter, and the other end is connected to the storage battery of the electric vehicle. Each high-frequency inverter outputs a high-frequency AC bus to supply power for the loads in the corresponding load area, and the four high-frequency inverters are in a parallel operation state through a high-frequency connection point that connects the (Continued)

four high-frequency AC buses. The present invention has the advantages of simplifying the electrical system structure of the electric vehicle, improving the system stability, and the like.

2 Claims, 1 Drawing Sheet

(51) Int. Cl.
| | | |
|---|---|---|
| *B60L 50/51* | (2019.01) | |
| *H02J 3/00* | (2006.01) | |
| *B60R 16/03* | (2006.01) | |
| *H02J 3/10* | (2006.01) | |
| *H02M 1/44* | (2007.01) | |
| *H02J 5/00* | (2016.01) | |
| *H02M 5/22* | (2006.01) | |

(52) U.S. Cl.
CPC .............. *H02J 3/0073* (2020.01); *H02J 3/10* (2013.01); *H02M 1/44* (2013.01); *B60L 2210/40* (2013.01); *H02J 5/00* (2013.01); *H02M 5/225* (2013.01); *Y02T 10/70* (2013.01); *Y02T 10/72* (2013.01)

(56) References Cited

U.S. PATENT DOCUMENTS

| | | | | |
|---|---|---|---|---|
| 2013/0241444 A1* | 9/2013 | Fotherby | ................ | H02M 1/14 318/51 |
| 2015/0092432 A1* | 4/2015 | Arita | .................... | B60Q 1/0094 362/509 |
| 2015/0174981 A1* | 6/2015 | Buma | ................ | G06K 9/00798 701/38 |

FOREIGN PATENT DOCUMENTS

| | | |
|---|---|---|
| CN | 204623170 U | 9/2015 |
| CN | 105291842 A | 2/2016 |
| CN | 205202750 U | 5/2016 |
| EP | 2849308 A1 | 3/2015 |
| JP | 2012/075226 A | 4/2012 |

* cited by examiner

DISTRIBUTED HIGH-FREQUENCY AC ELECTRICAL SYSTEM FOR THE ELECTRIC VEHICLE

FIELD OF THE INVENTION

The present invention is directed to the technical field of the electrical system in electric vehicles, in particular to a distributed high-frequency AC (HFAC) electrical system for the electric vehicle.

BACKGROUND OF THE INVENTION

Presently, the electrical systems in automobiles are mainly 14V or 42V DC power distribution systems. With the increasing of the vehicles' loads and their power ratings, the 14V DC power distribution system no longer meets the demands of the capacity growth, which leads to increased costs, higher weight, and decreased transmission efficiency. Meanwhile, the 42V DC power-net, proposed by the American Society of Automotive Engineers in the 1990s, is hard to be adopted widely, resulting from its poor safety, low electromagnetic compatibility, electric arc, serious corrosion of the wiring harness joints, and needs for additional 42V/14V converters to meet the requirements from equipment manufacturers.

The HFAC power distribution system transmits the power at the frequency of several kilohertz or higher to achieve the high-efficiency and low-cost power allocation. Since put forward by the NASA Lewis Research Center in the 1980s, it has shown outstanding advantages in fields of aerospace and communication. With the progress of society and the development of technology, more and more space- and volume-limited power distribution systems, such as the electrical system of electric vehicles, micro-grids, shipboard power distribution systems, are faced with more complex load-types and increasing capacity demands. Reducing the costs, increasing the transmission efficiency, saving the space, improving the load capacity, and providing a superior, safer, and more environmentally friendly application environment, are the common challenges. As an advanced power distribution solution, the HFAC technology provides an effective way of exploration and direction of development for this purpose.

SUMMARY OF THE INVENTION

To solve the above-mentioned problems in the prior art, a distributed HFAC electrical system for the electric vehicle is presented in the invention. The distributed HFAC technique is introduced into the electrical system of vehicles, which means the original 14V or 42V DC distribution buses are replaced by HFAC buses.

To realize the above objectives, the technical solution provided by the present invention is a distributed HFAC electrical system for the electric vehicle, wherein all loads of the electric vehicle are divided into four load areas according to the spatial positions, which are a front lighting and motor load area, a right lighting and motor load area, a left lighting and motor load area, and a high-power load area including the electric suspension system of the electric vehicle. Four high-frequency inverters and four DC input interfaces are contained in the HFAC electrical system, with each of the four load areas being configured with one of the four high-frequency inverters, and each of the four high-frequency inverters being configured with one of the four DC input interfaces. One end of each DC input interface is connected to DC side of the corresponding high-frequency inverter, and the other end is connected to the storage battery of the electric vehicle. Each high-frequency inverter outputs a HFAC bus to supply power for the loads in the corresponding load area. The four high-frequency inverters are in a parallel operation state through a high-frequency connection point that connects the four HFAC buses.

The storage battery is connected to the four high-frequency inverters through a DC bus.

Each load in the four load areas is connected to the corresponding HFAC bus through a high-frequency transformer, and an AC/DC rectification module or an AC/AC frequency conversion module.

Compared with the prior art, the present invention has the following advantages and beneficial effects:

1. The weight of the wiring-harness can be reduced, and the copper materials can be saved.

2. The numbers of power converters can be decreased, and the volume and weight of the passive components can be reduced. As a result, the whole systems can be simplified.

3. Both reliable high-frequency electrical isolation and convenient voltage conversion can be provided.

4. The distributed electrical structure can be realized easily.

5. The drive of the 400 Hz motor, as well as the LED lighting system, can be realized with high efficiency.

6. The system is safer for human bodies and easier to design the AC breakers.

7. A more comfortable user experience can be provided when combined with the non-contact charging technology.

8. The HFAC transmission has data communication capability, thus the power line carrier communication can be realized. In other words, the electrical and electronic systems of vehicles can be further simplified.

In addition to the advantages of the HFAC power distribution system, the distributed HFAC electrical system have other merits as: the reactive power and harmonics in each distributed area can be effectively controlled; the high-frequency transmission losses caused by the skin and proximity effects can be reduced; the soft-switching can be achieved easily, improving the conversion efficiency and reducing the electromagnetic interference (EMI); the distributed structure can improve the reliability of the power distribution system, realize the local power constraint, and enhance the safety of the whole electrical system.

EMBODIMENT OF THE INVENTION

The present invention will be further described in detail below with reference to examples and figures. However, the embodiments of the present invention are not limited thereto.

Figure 1:
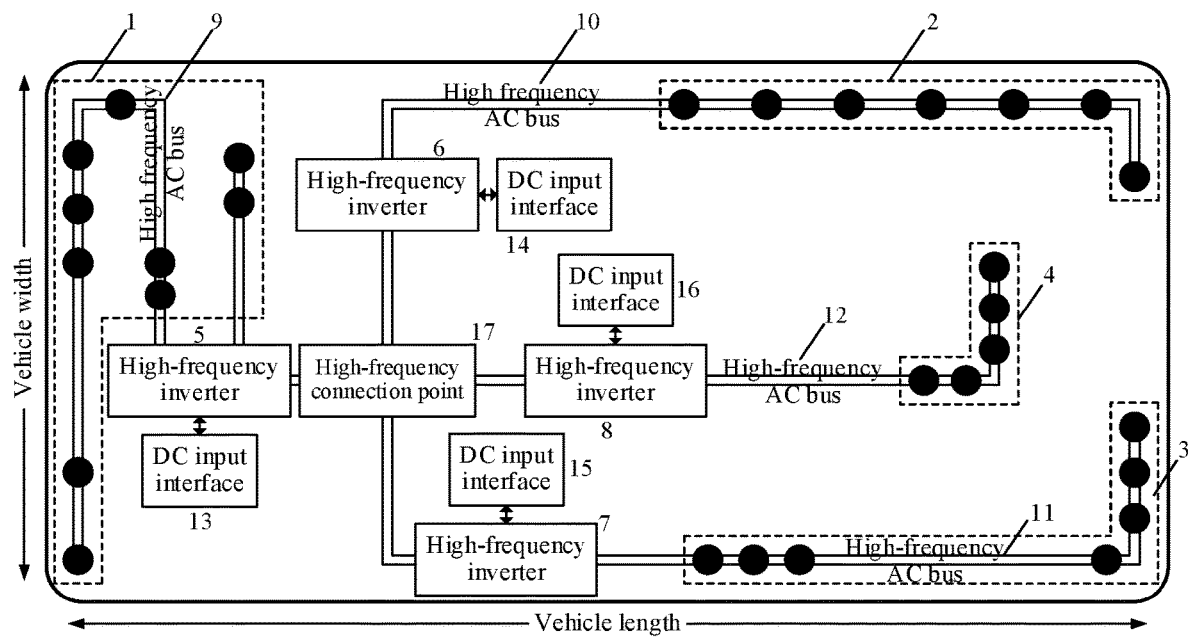
FIG. 1 shows the component connection relationships of the present invention, i.e., a distributed HFAC electrical system for the electric vehicle.

As shown in FIG. 1, the present invention discloses a distributed HFAC electrical system for the electric vehicle, wherein all loads of the electric vehicle are divided into four load areas according to the spatial positions, which are a front lighting and motor load area 1, a right lighting and motor load area 2, a left lighting and motor load area 3, and a high-power load area 4 including a electric suspension system of the electric vehicle. Four high-frequency inverters 5, 6, 7, 8 and four DC input interfaces 13, 14, 15, 16 are contained in the HFAC electrical system, with each of the four load areas being configured with one of the four high-frequency inverters, and each of the four high-frequency inverters being configured with one of the four DC input interfaces. That is, the front lighting and motor load area 1 is configured with a high-frequency inverter 5, and the high-frequency inverter 5 is configured with a DC input interface 13; the right lighting and motor load area 2 is configured with a high-frequency inverter 6, and the high-frequency inverter 6 is configured with a DC input interface 14; the left lighting and motor load area 3 is configured with a high-frequency inverter 7, and the high-frequency inverter 7 is configured with a DC input interface 15; the high-power load area 4 is configured with a high-frequency inverter 8, and the high-frequency inverter 8 is configured with a DC input interface 16. One end of each of the four DC input interface 13, 14, 15, 16 is connected to the DC side of the corresponding high-frequency inverter, and the other end is connected to a storage battery 18 of the electric vehicle. Each of the four high-frequency inverters 5, 6, 7, 8 outputs a HFAC bus. That is, there are a total of four HFAC buses 9, 10, 11, 12, which provide power for the loads in corresponding load areas. Specifically, the HFAC bus 9 provides power for the loads in the front lighting and motor load area 1; the HFAC bus 10 provides power for the loads in the right lighting and motor load area 2; the HFAC bus 11 provides power for the loads in the left lighting and motor load area 3; the HFAC bus 12 provide power for the loads in the high-power load area 4. Moreover, the above four high-frequency inverters 5, 6, 7, 8 are in a parallel operation state through a high-frequency connection point 17, which connects the four HFAC buses 9, 10, 11, 12 of the four high-frequency inverters.

Figure 2:
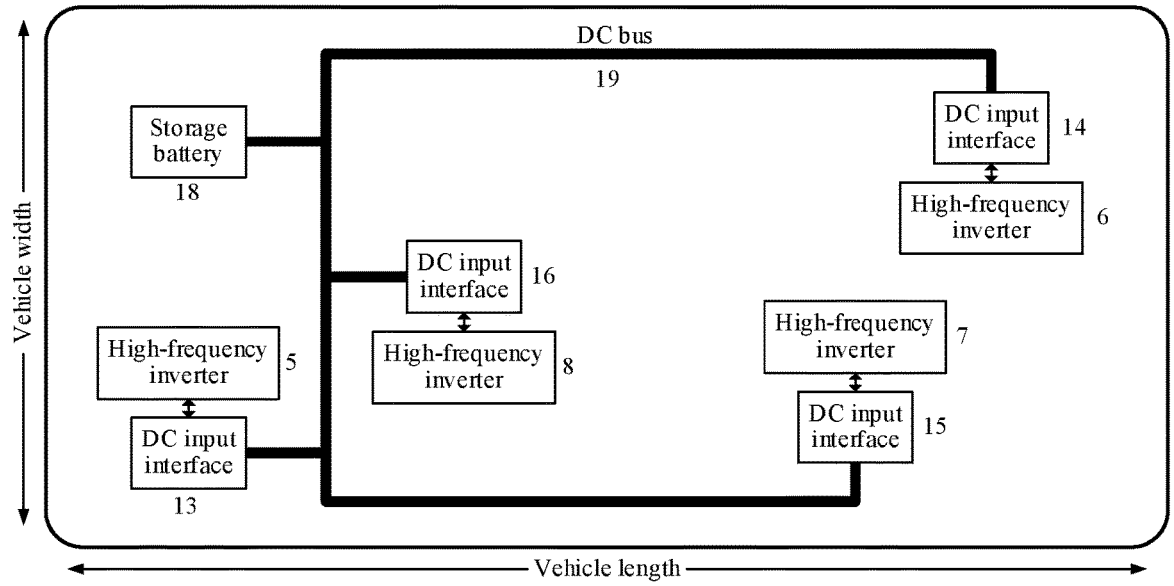
FIG. 2 shows the connection relationship between the storage battery and DC input interfaces in the present invention.

As shown in FIG. 2, the storage battery 18 is connected to the high-frequency inverters distributed in the corresponding load areas through a DC bus 19.

Figure 3:
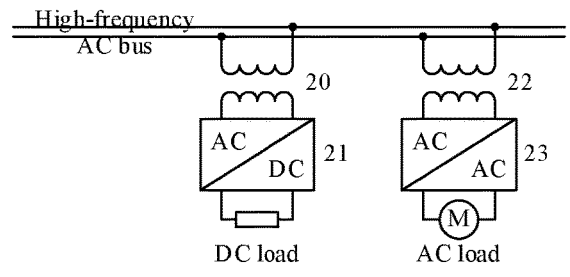
FIG. 3 shows the connection relationship between the loads and the HFAC bus in the present invention.

As shown in FIG. 3, each load is connected to HFAC bus through a high-frequency transformer 20, 22, and an AC/DC rectification module 21 or an AC/AC frequency conversion module 23.

Overall, all loads of the electric vehicle are divided into four load areas according to the spatial positions in the present invention. Four high-frequency inverters and four DC input interfaces are respectively configured to realize the DC/HFAC conversion of the power from the storage battery. The four load areas are supplied by four HFAC buses, respectively, and the loads in each area are supplied by the voltage regulation modules in the load terminals, which realize the voltage transformation, and rectification or frequency conversion. Compared with the prior art, the present invention can simplify the structure of the vehicle's electrical system, and improve its reliability, which is worth being promoted.

The above example is the preferred embodiment of the present invention. However, the embodiments of the present invention are not limited by the above example, and any other alteration, modification, substitution, combination, and simplification made without departing from the spiritual essence and principle of the present invention are equivalent replacements, and fall within the protection scope of the present invention.

What is claimed is:

1. A distributed high-frequency AC electrical system for an electric automobile, wherein all loads of the electric automobile are divided into four load areas according to their spatial positions, which are a front lighting and motor load area, a right lighting and motor load area, a left lighting and motor load area, and a high-power load area including an electric suspension system of the electric automobile; four high-frequency inverters and four DC input interfaces are contained in the system, with each of the four load areas being configured with only one of the four high-frequency inverters, and each of the four high-frequency inverters being configured with one of the four DC input interfaces; one end of each of the DC input interfaces is connected to a DC side of the corresponding high-frequency inverter, and the other end is connected to a storage battery of the electric automobile; each high-frequency inverter outputs a high-frequency AC bus to only supply power for the loads in the corresponding load area; the four high-frequency inverters are in a parallel operation state through a high-frequency connection point that connects the four high-frequency AC buses; wherein each of the four high-frequency inverters comprises three separate connection ends, a first connection end is connected to the corresponding high-frequency AC bus, a second connection end is connected to the high-frequency connection point common to the four high-frequency inverters, and a third connection is connected to the corresponding DC input interface; and wherein each of the four high-frequency inverters is distributed in the corresponding load area, the loads in the four load areas comprise at least one DC load and at least one AC load, and each load in the four load areas is connected to the high-frequency AC bus through a high-frequency transformer, and an AC/DC rectification module or an AC/AC frequency conversion module.

2. The distributed high-frequency AC electrical system for the electric automobile according to claim 1, wherein the storage battery is connected to the four high-frequency inverters through a DC bus.

\* \* \* \* \*